R. HUMPHREYS.
CAKE DROPPING MACHINE.
APPLICATION FILED AUG. 8, 1914.

1,151,465.

Patented Aug. 24, 1915.
2 SHEETS—SHEET 1.

Witnesses:
Christ Peinle, Jr.
F. O. Darden

Inventor,
Robert Humphreys.
By Victor J. Evans,
Attorney.

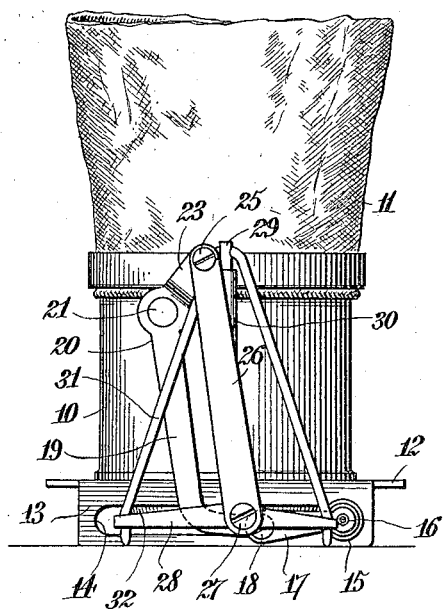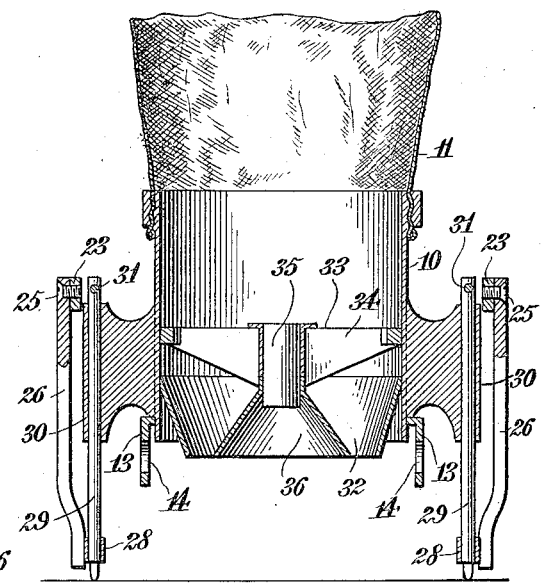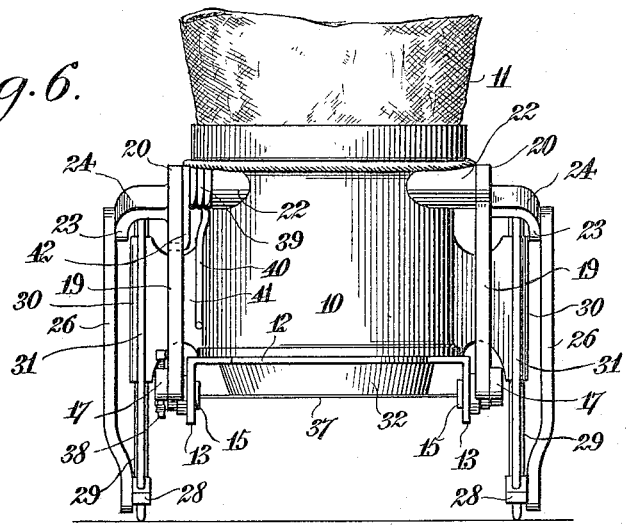

UNITED STATES PATENT OFFICE.

ROBERT HUMPHREYS, OF HENRYETTA, OKLAHOMA.

CAKE-DROPPING MACHINE.

1,151,465.  Specification of Letters Patent.  Patented Aug. 24, 1915.

Application filed August 3, 1914. Serial No. 855,304.

*To all whom it may concern:*

Be it known that I, ROBERT HUMPHREYS, a subject of the King of Great Britain, residing at Henryetta, in the county of Okmulgee and State of Oklahoma, have invented new and useful Improvements in Cake-Dropping Machines, of which the following is a specification.

The invention relates to a cake dropping machine, and has for its primary object to provide a machine of this character wherein the dough or material for the cake will be fed thereto so that on operating the machine the dough or material will be cut into slices or separate parts to be deposited or dropped within a pan or other receptacle therefor for the cooking of the same.

Another object of the invention is the provision of a machine of this character wherein the cutting wire for severing the material or dough is mounted in a novel manner and is operated to cut the dough or material for the dropping of cakes from the machine.

A further object of the invention is the provision of a machine of this character wherein the details of construction are generally improved and rendered compact to assure the perfect working of the same.

A still further object of the invention is the provision of a machine of this character which is simple in construction, thoroughly reliable and efficient in operation, readily and easily cleaned to render the same sanitary, and also which is inexpensive in manufacture.

With these and other objects in view, the invention consists in the construction, combination and arrangement of parts as will be hereinafter fully described, illustrated in the accompanying drawing, and pointed out in the claims hereunto appended.

Figure 1:
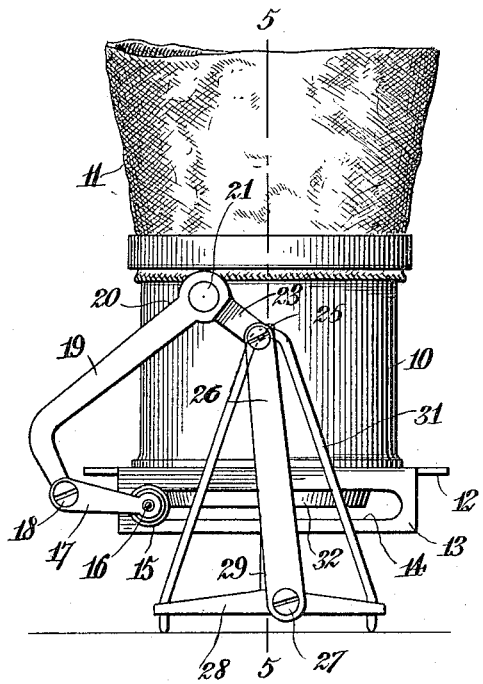
Figure 2:
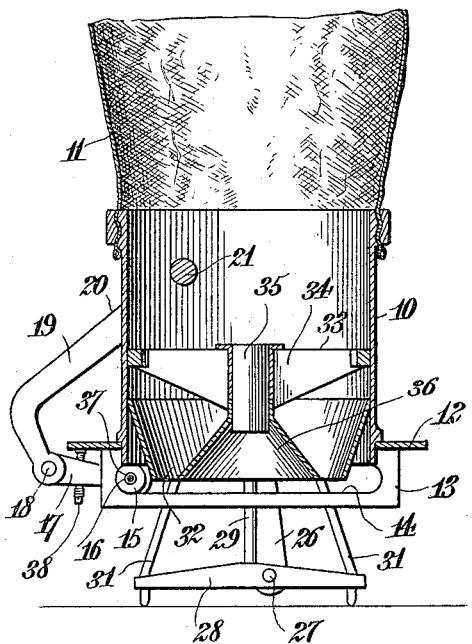
Figure 4:
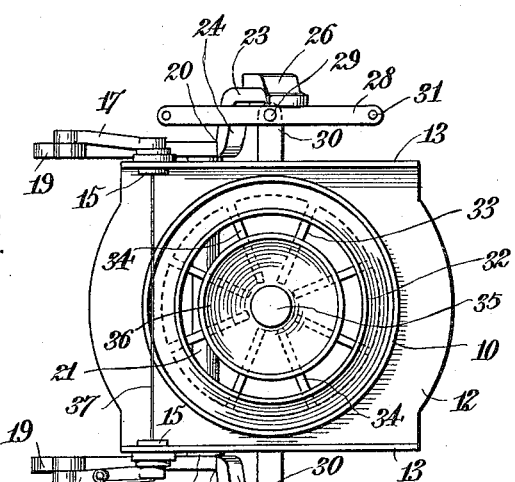

In the drawings:—Figure 1 is a side elevation of a machine constructed in accordance with the invention. Fig. 2 is a vertical longitudinal sectional view therethrough. Fig. 3 is a view similar to Fig. 1, showing parts of the machine shifted for the severing of dough from the bulk. Fig. 4 is a bottom plan view. Fig. 5 is a sectional view on the line 5—5 of Fig. 1. Fig. 6 is a front elevation of the machine.

Similar reference characters indicate corresponding parts throughout the several views in the drawings.

Referring to the drawing in detail, the machine comprises a cylindrical body 10 preferably made from metal, and to the upper end of which is detachably connected a hopper shaped flexible feed bag 11 preferably made from canvas, while the body in this instance is made from metal, although the same may be made from any other suitable material, the smaller end of the bag 11 being detachably clamped to the upper end of the body in any suitable manner, and permanently fixed to the opposite end of the body is a plate 12 formed with opposite down-turned flanges 13 provided with elongated slots 14 forming guide ways for rollers 15 journaled upon hollow bosses or lugs 16 fixed in or integral with the ends of links 17 which are swingingly supported upon pivots 18 mounted in the long arms 19 of bell crank levers 20 which are fixed to the opposite ends of a main rocking shaft 21 journaled in bearings 22 formed on the body 10, the said shaft being extended through the latter.

The short arms 23 of the bell crank levers are formed with offset portions 24 and support pivots 25 to which are connected operating bars 26, the same being pivoted at 27 to the feet 28 of plungers 29, the same being slidably mounted in guide sleeves 30 arranged vertically and extending from diametrically opposite sides of the body 10. Passed through the upper ends of the plungers 29 and fixed in the feet 28 are brace rods 31 which materially strengthen the feet and rigidly connect the latter with the said plungers to assure the proper working of the machine.

Mounted in the body 10, and projected through the lower discharge end thereof is a funnel-shaped ring 32, while above the said ring interiorly of the body 10 is a spider 33, the radial wings 34 of which extend toward the center of the body to support the movable stem 35 of a funnel-shaped spreader 36, which is only used when it is desired to form doughnuts from the material or dough, the spreader 36 being removed when cakes are to be cut by the machine.

Passed through the hollow bosses or lugs 16 is a cutting wire 37, one end of which is suitably fixed in one of the bosses or lugs, while the opposite end is engaged with a tightening screw 38 adjustably mounted in one of the links 17 so that the wire can be drawn taut, and this wire is adapted to pass across the discharge end of the funnel ring 32 for severing the dough into slices or cakes to be deposited in a pan or the like.

Surrounding the rocking shaft 21 is a coiled expansion spring 39, one end 40 of which engages the web 41 of one of the guide sleeves 30, while the opposite end 42 of the spring is engaged in one of the long arms 19 of one lever 20, the spring being designed to lower the plunger 29 in the sleeves 30 to normally position the cutting wire 37 at one side of the ring 32 so that on depressing the body 10 when the feet 28 are resting upon the pan the lever 20 will be shifted to throw the cutting wire 37 across the discharge end of the ring 32 so that on the movement of the wire 37 in one direction under the action of the spring 39 it will sever the dough into slice form for forming a cake which is dropped from the machine into the pan.

To advance the dough within the body 10 of the machine the operator twists the bag 11 at the open end thereof, thereby compressing the dough and forcing it into the body 10 to be acted upon by the cutting wires 37 for slicing it into cakes.

It is to be understood that the piece 28 can be dispensed with, and in this instance the bars 26 will be pivoted directly to the plungers 29 without affecting the operation of the machine.

From the foregoing it is thought that the construction and manner of operation of the device will be clearly understood, and therefore a more extended explanation has been omitted.

What is claimed is:—

1. A machine of the class described comprising a hollow body, bell crank levers pivoted exteriorly to the body at opposite sides thereof, guides formed at opposite sides of the body, rollers movable in the guides, links pivoted to the bell crank levers and having hollow lugs forming journals for the rollers, a cutting wire mounted in said lugs and movable across the discharge end of the body, and slidable means carried by the body and having connection with the levers for operating the same to move the wire.

2. A machine of the class described comprising a hollow body, bell crank levers pivoted exteriorly to the body at opposite sides thereof, guides formed at opposite sides of the body, rollers movable in the guides, links pivoted to the bell crank levers and having hollow lugs forming journals for the rollers, a cutting wire mounted in said lugs and movable across the discharge end of the body, slidable means carried by the body and having connection with the levers for operating the same to move the wire, and means for tightening the wire and supported by one of the links.

3. A machine of the class described comprising a hollow body, bell crank levers pivoted exteriorly to the body at opposite sides thereof, guides formed at opposite sides of the body, rollers movable in the guides, links pivoted to the bell crank levers and having hollow lugs forming journals for the rollers, a cutting wire mounted in the said lugs and movable across the discharge end of the body, slidable means carried by the body and having connection with the levers for operating the same to move the wire, means for tightening the wire and supported by one of the links, and spring means acting upon one of the levers to move the cutting wire to normal position at one side of the body.

In testimony whereof I affix my signature in presence of two witnesses.

ROBERT HUMPHREYS.

Witnesses:
CHAS. HALEY,
W. O. NORTON.

Copies of this patent may be obtained for five cents each, by addressing the "Commissioner of Patents, Washington, D. C."